(12) United States Patent (10) Patent No.: US 12,657,894 B2
Kim et al. (45) Date of Patent: Jun. 16, 2026

(54) APPARATUS AND METHOD FOR CLASSIFYING DOMAIN NON-SPECIFIC IMAGES USING TEXT

(71) Applicant: Korea University Research and Business Foundation, Seoul (KR)

(72) Inventors: Jin Kyu Kim, Seoul (KR); No Kyung Park, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 304 days.

(21) Appl. No.: 18/528,692

(22) Filed: Dec. 4, 2023

(65) Prior Publication Data

US 2024/0346812 A1 Oct. 17, 2024

(30) Foreign Application Priority Data

Apr. 11, 2023 (KR) ........................ 10-2023-0047711

(51) Int. Cl.
*G06V 10/80* (2022.01)
*G06F 40/284* (2020.01)
*G06V 10/764* (2022.01)
*G06V 10/77* (2022.01)
*G06V 10/774* (2022.01)
(Continued)

(52) U.S. Cl.
CPC .......... *G06V 10/811* (2022.01); *G06F 40/284* (2020.01); *G06V 10/764* (2022.01); *G06V 10/7715* (2022.01); *G06V 10/774* (2022.01); *G06V 10/776* (2022.01); *G06V 10/806* (2022.01); *G06V 10/82* (2022.01)

(58) Field of Classification Search
CPC .............. G06V 10/811; G06V 10/764; G06V 10/7715; G06V 10/774; G06V 10/776; G06V 10/806; G06V 10/82; G06F 40/284; G06F 18/00
See application file for complete search history.

(56) References Cited

U.S. PATENT DOCUMENTS

2022/0391755 A1* 12/2022 Li ........................ G06V 30/153
2023/0104127 A1 4/2023 Babagholami et al.
2024/0153258 A1* 5/2024 Mangla ................ G06V 10/764

FOREIGN PATENT DOCUMENTS

CN 110443293 A 11/2019
CN 113569932 A * 10/2021 .......... G06F 18/214
CN 114821196 A * 7/2022 ............. G06N 3/045
(Continued)

OTHER PUBLICATIONS

Korean Notice of Allowance issued on Dec. 26, 2023, in connection with the Korean Patent Application No. 10-20230047711, with its English translation, 10 pages.

*Primary Examiner* — Jennifer Mehmood
*Assistant Examiner* — Vaisali Rao Koppolu
(74) *Attorney, Agent, or Firm* — HAUPTMAN HAM, LLP

(57) ABSTRACT

Disclosed is an apparatus for classifying domain non-specific images using text according to one embodiment of the present invention. According to the present invention, the learning process is performed not only using the images but also text information together, and thus even during training on images from only a few specific domains, it is possible to effectively classify the images from different domains with high accuracy by applying the human inference process.

10 Claims, 10 Drawing Sheets

(51) Int. Cl.
    *G06V 10/776*     (2022.01)
    *G06V 10/82*     (2022.01)

(56)               References Cited

FOREIGN PATENT DOCUMENTS

| CN | 115205592 | A | 10/2022 |
| CN | 115410031 | A | 11/2022 |
| KR | 10-2279797 | B1 | 7/2021 |
| KR | 10-2022-0138696 | A | 10/2022 |
| KR | 10-2023-0014034 | A | 1/2023 |

* cited by examiner

1000

Domains: ● Photo ▲ Cartoon ■ Art ★ Paint

Domains: ● Photo ▲ Cartoon ■ Art ★ Paint

FIG. 9

| Model | D | A | M | T | Target Domain | | | | Avg |
|---|---|---|---|---|---|---|---|---|---|
| | | | | | Photo | Cartoon | Art | Paint | |
| PRESENT INVENTION /PTE | ✓ | | | ✓ | 74.6 | 64.2 | 52.2 | 37.0 | 57.0 |
| PRESENT INVENTION /STE | ✓ | | | ✓ | 74.3 | 63.9 | 50.0 | 38.1 | 56.6 |
| CORAL | ✓ | | | | 72.2 | 63.5 | 50.3 | 35.8 | 55.4 |
| SD | | | | | 71.3 | 62.2 | 50.8 | 34.8 | 54.7 |
| SagNet | ✓ | ✓ | | | 67.4 | 60.7 | 44.0 | 34.2 | 51.6 |
| MixStyle | | | | ✓ | 59.0 | 56.7 | 50.3 | 35.8 | 50.4 |
| Mixup | | | | ✓ | 67.1 | 55.9 | 51.1 | 27.2 | 50.3 |
| DANN | ✓ | ✓ | | | 67.5 | 57.0 | 42.8 | 30.6 | 49.5 |
| CDANN | ✓ | ✓ | | | 65.3 | 55.2 | 43.2 | 30.5 | 48.6 |
| VREx | ✓ | | | | 63.9 | 54.9 | 38.6 | 30.1 | 46.9 |
| ERM | | | | | 62.5 | 53.2 | 37.4 | 29.0 | 45.5 |
| ARM | | | | | 62.3 | 51.2 | 38.2 | 28.4 | 45.0 |
| GroupDRO | ✓ | | | | 60.9 | 54.8 | 36.5 | 27.0 | 44.8 |
| IRM | | | | | 60.6 | 51.6 | 36.5 | 30.3 | 44.8 |

FIG. 10

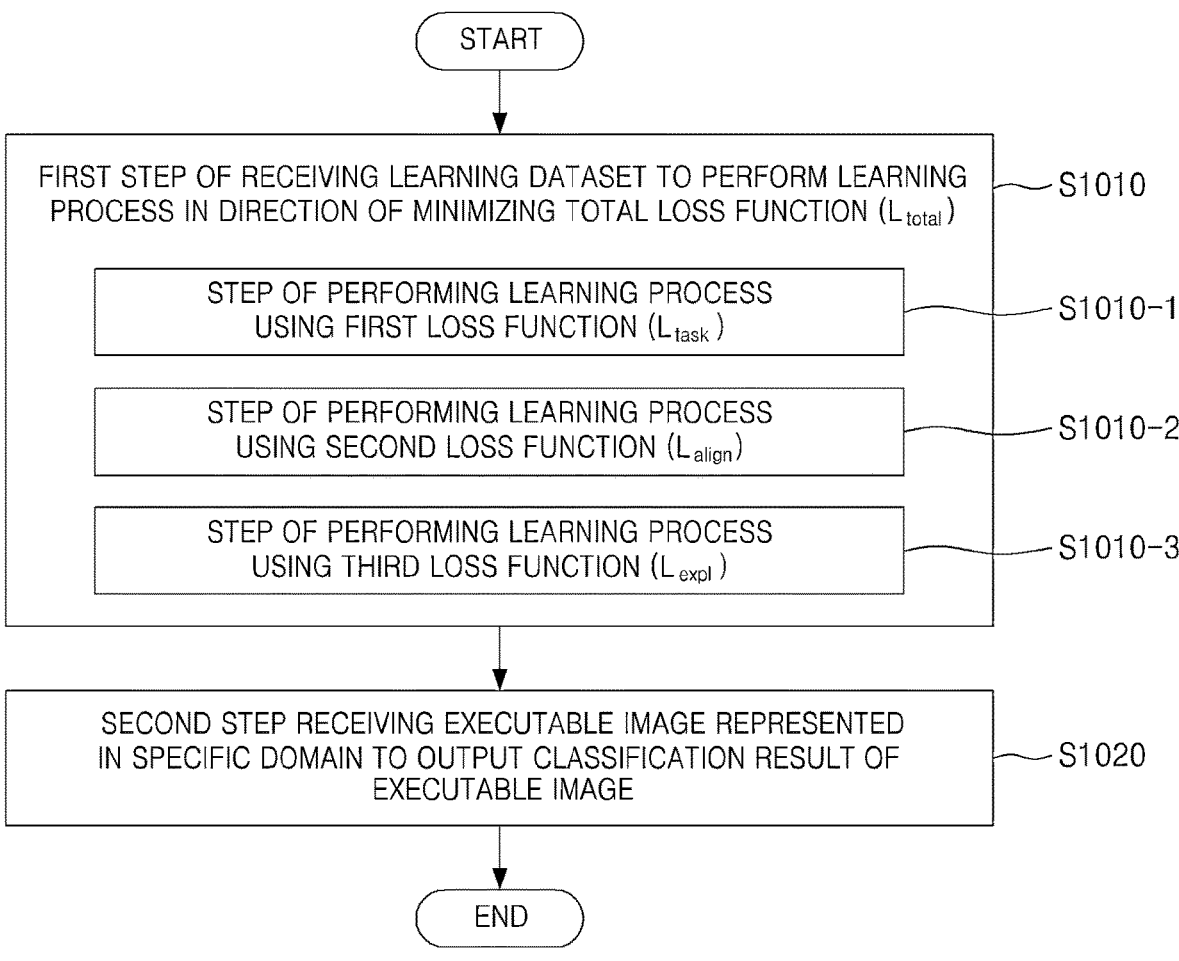

START

FIRST STEP OF RECEIVING LEARNING DATASET TO PERFORM LEARNING PROCESS IN DIRECTION OF MINIMIZING TOTAL LOSS FUNCTION ($L_{total}$) — S1010

STEP OF PERFORMING LEARNING PROCESS USING FIRST LOSS FUNCTION ($L_{task}$) — S1010-1

STEP OF PERFORMING LEARNING PROCESS USING SECOND LOSS FUNCTION ($L_{align}$) — S1010-2

STEP OF PERFORMING LEARNING PROCESS USING THIRD LOSS FUNCTION ($L_{expl}$) — S1010-3

SECOND STEP RECEIVING EXECUTABLE IMAGE REPRESENTED IN SPECIFIC DOMAIN TO OUTPUT CLASSIFICATION RESULT OF EXECUTABLE IMAGE — S1020

END

APPARATUS AND METHOD FOR CLASSIFYING DOMAIN NON-SPECIFIC IMAGES USING TEXT

CROSS-REFERENCE TO RELATED PATENT APPLICATION

This application claims the benefit of Korean Patent Application No. 10-2023-0047711, filed on Apr. 11, 2023, in the Korean Intellectual Property Office, the disclosure of which is incorporated herein in its entirety by reference.

BACKGROUND OF THE INVENTION

1. Field of the Invention

The present invention relates to an apparatus for classifying domain non-specific images using text and a method for the same. More specifically, the present invention relates to relates to an apparatus and method that can classify images regardless of the domains of the images using text information.

2. Description of the Related Art

Recently, the performance of artificial intelligence models for image classification based on large amounts of learning data has been rapidly improving, and in some cases, they demonstrate higher classification performance than human manual classification, which are thus widely utilized in various fields.

The classification performance of such artificial intelligence models for image classification may vary depending on the domains (styles) of images that the artificial intelligence models have been trained on. For example, if an artificial intelligence model for image classification that has been trained on images from the sketch domain receives images form the watercolor domain, the classification performance will significantly decrease, which becomes more pronounced when there is a significant difference between the domain of learning images and the domain of actual executable images.

To address such issues, some industry experts have suggested collecting images from a variety of domains as much as possible to train artificial intelligence models for image classification. However, it is practically impossible to collect all types of existing domains and images from the domains, and new domains that did not exist are constantly created by creators. Therefore, a more fundamental solution is required to address these challenges, and the present invention has been made in view of the above circumstances.

REFERENCES OF THE RELATED ART

Patent Document

Korean Patent Application Publication No.: 10-2022-0138696 (published on Oct. 13, 2022)

SUMMARY OF THE INVENTION

The present invention has been made in an effort to solve the above-described problems associated with prior art, and an object of the present invention is to provide an apparatus for classifying domain non-specific images using text and a method for the same, which can effectively classify the images from different domains with high accuracy even during training on images from only a few specific domains.

The above-mentioned objects of the present invention are not limited to those mentioned above, and other objects not mentioned will be clearly understood by those skilled in the art from the following description.

To achieve the above-mentioned objects, one embodiment of the present invention provides an apparatus for classifying domain non-specific images using text, comprising: an image classification unit that receives a learning image to generate a visual feature from the received learning image, generates and outputs a classification result of the learning image using the generated visual feature, and performs a learning process using a first loss function ($L_{task}$); an image-text fusion unit that receives a learning text to generate a textual feature from the received learning text, aligns the visual feature with the textual feature, and performs the learning process using a second loss function ($L_{align}$); and a text description generation unit that receives the visual feature and the classification result of the learning image to generate a text describing the learning image based on the inputs and performs the learning process using a third loss function ($L_{expl}$), wherein the learning image comprises one or more images represented in one or more domains for one or more classes, the learning text comprises one or more texts described in one or more texts for the one or more classes, and wherein the learning image and the learning text are included in one learning dataset.

According to one embodiment, the image classification unit may comprise a Residual Neural Network (ResNet) as an image encoder that generates the visual feature from the received learning image.

According to one embodiment, the image classification unit may perform the learning process using the first loss function ($L_{task}$) according to Equation 1 below:

$$L_{task} = -\sum_i y_i \log(\hat{y}_i) \qquad \text{Equation 1}$$

where y refers to a one-hot vector in which only the ground-truth label is 1 and the others are 0, and ŷ refers to the softmax distribution that is the classification result of the learning image generated using the visual features.

According to one embodiment, the image-text fusion unit may comprise a text encoder based on a contrastive language-image pre-training (CLIP) model that generates the textual feature from the received learning text.

According to one embodiment, the image-text fusion unit may use the text description generation unit as a text encoder that generates the textual feature from the received learning text.

According to one embodiment, the image-text fusion unit may perform the learning process using the second loss function ($L_{align}$) according to Equation 2 below:

$$L_{align} = \left\| f_{proj}(v) - g_{prog}(x) \right\|_2 - \sum_i y_i \log(\hat{y}_i) \qquad \text{Equation 2}$$

where $f_{proj}$ refers to the projection layer for textual features, $g_{proj}$ refers to the projection layer for visual features, y refers to a one-hot vector in which only the ground-truth label is 1 and the others are 0, and ȳ refers to the softmax distribution obtained from $g_{prog}(x)$.

According to one embodiment, the text description generation unit may comprise a first long short-term memory (LSTM) layer and a second LSTM layer, wherein the second LSTM layer receives an output token from the first LSTM layer, the visual features and the classification result of the learning image, generates a softmax probability value for each word held by the text description generation unit, and outputs a word token with the highest probability value, and wherein the output of the word token may be repeated until the word token output by the second LSTM layer satisfies an-end of-sentence token (EOS) or a predetermined number of sampled word tokens.

According to one embodiment, the text description generation unit may perform the learning process using a third loss function ($L_{expl}$) according to Equation 3 below:

$$L_{expl} = -\sum_t \log P(o_{t+1} \mid o_{0:t}, I, C) - E_{\tilde{o} \sim P(o|I,c)}[R(\tilde{O})] \qquad \text{Equation 3}$$

where, $\tilde{O} \sim p(o|I,c)$ refers to the sentence sampled to generate a text describing the learning image, $p(O|I,C)$ refers to the estimated distribution for the description (o) when the learning image (I) and the class (C) are given as conditions, and $R(\tilde{O})$ refers to the softmax probability per class when there is a sentence ($\tilde{O}$) generated from $P(c|\tilde{o})$.

According to one embodiment, the apparatus may perform the learning process in the direction of minimizing the total loss function ($L_{total}$) that is the same of the first loss function ($L_{task}$), the second loss function ($L_{align}$), and the third loss function ($L_{expl}$).

To achieve the above-mentioned objects, another embodiment of the present invention provides a method for classifying domain non-specific images using text, performed by an apparatus comprising a process and a memory, the method comprising: (a) a first step of receiving a learning dataset as an input to perform a learning process in the direction of minimizing the total loss function ($L_{total}$); and (b) a second step of receiving an executable image represented in a specific domain to output a classification result of the executable image, wherein the learning dataset contains one or more learning images represented in one or more domains for one or more classes and one or more learning texts described in one or more texts for the one or more classes, wherein the first step comprises the steps of: (1-1) receiving the learning image to generate a visual feature from the received learning image, generating and outputting a classification result of the learning image using the generated visual feature, and performing the learning process using a first loss function ($L_{task}$); (1-2) receiving the learning text to generate a textual feature from the received learning text, aligning the visual feature with the textual feature, and performing the learning process using a second loss function ($L_{align}$); and (1-3) receiving the visual feature and the classification result of the learning image to generate a text describing the learning image based on the inputs and performing the learning process using a third loss function ($L_{expl}$).

To achieve the above-mentioned objects, still another embodiment of the present invention provides a computer program stored on a computer-readable medium, when executed on a computing device, performing: (AA) a first step of receiving a learning dataset as an input to perform a learning process in the direction of minimizing the total loss function ($L_{total}$); and (BB) a second step of receiving an executable image represented in a specific domain to output a classification result of the executable image, wherein the learning dataset contains one or more learning images represented in one or more domains for one or more classes and one or more learning texts described in one or more texts for the one or more classes, wherein the first step comprises the steps of: (1-1) receiving the learning image to generate a visual feature from the received learning image, generating and outputting a classification result of the learning image using the generated visual feature, and performing the learning process using a first loss function ($L_{task}$); (1-2) receiving the learning text to generate a textual feature from the received learning text, aligning the visual feature with the textual feature, and performing the learning process using a second loss function ($L_{align}$); and (1-3) receiving the visual feature and the classification result of the learning image to generate a text describing the learning image based on the inputs and performing the learning process using a third loss function ($L_{expl}$).

According to the present invention as described above, the learning process is performed not only using the images but also text information together, and thus even during training on images from only a few specific domains, it is possible to effectively classify the images from different domains with high accuracy by applying the human inference process.

The effects of the present invention are not limited to the effects mentioned above, and other effects not mentioned will be clearly understood by those skilled in the art from the description below.

BRIEF DESCRIPTION OF THE DRAWINGS

The above and other features and advantages of the present invention will become more apparent by describing in detail exemplary embodiments thereof with reference to the attached drawings in which:

FIGS. 7 to 9 show performance evaluation data for the apparatus for classifying domain non-specific images using text according to the second embodiment of the present invention, compared to the prior art; and FIG. 10 is a flowchart illustrating the main steps of a method for classifying domain non-specific images using text, according to a third embodiment of the present invention.

DETAILED DESCRIPTION OF THE INVENTION

Figure 1:
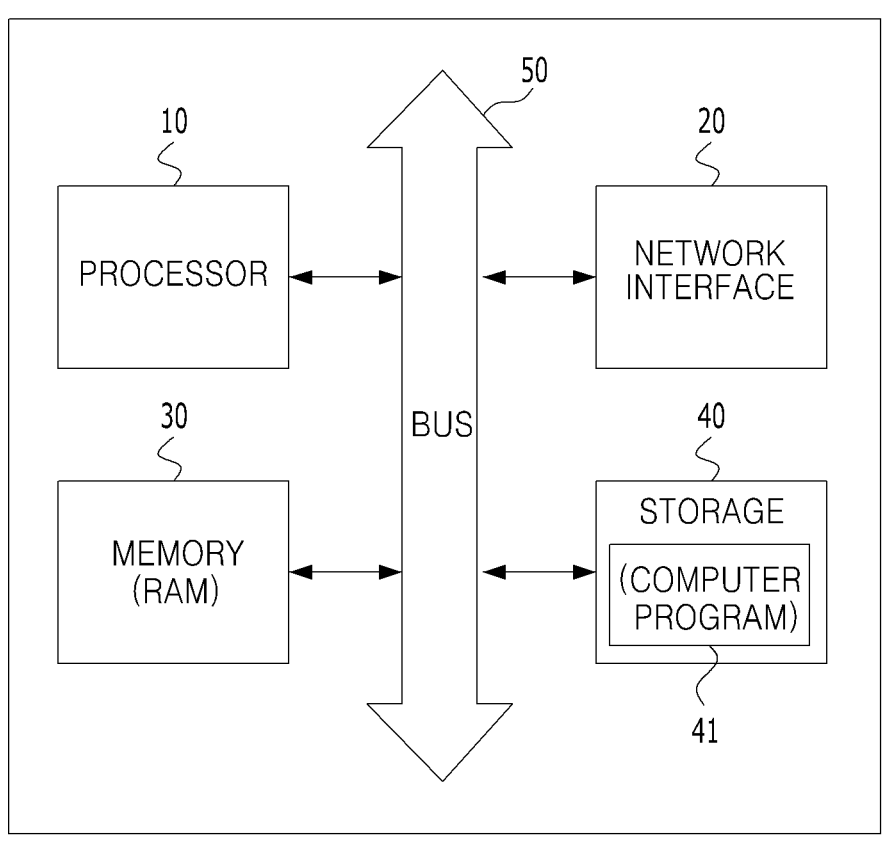
FIG. 1 is a diagram illustrating the overall configuration of an apparatus for classifying domain non-specific images using text according to a first embodiment of the present invention.

Details regarding the objects and technical features of the present invention and the resulting effects will be more clearly understood from the following detailed description based on the drawings attached to the specification of the present invention. Preferred embodiments according to the present invention will be described in detail with reference to the attached drawings.

The embodiments disclosed in this specification should not be construed or used as limiting the scope of the present invention. It is obvious to those skilled in the art that the description, including the embodiments, of this specification has various applications. Therefore, any embodiments described in the detailed description of the present invention are illustrative to better illustrate the present invention and are not intended to limit the scope of the present invention to the embodiments.

The functional blocks shown in the drawings and described below are only examples of possible implementations. In other implementations, different functional blocks may be used without departing from the spirit and scope of the detailed description. Moreover, although one or more functional blocks of the present invention are shown as individual blocks, one or more of the functional blocks of the present invention may be a combination of various hardware and software components that perform the same function.

Furthermore, the term "comprising" certain components, which is an "open-ended" term, simply refers to the presence of the corresponding components, and should not be understood as excluding the presence of additional components.

In addition, if a specific component is referred to as being "connected" or "coupled" to another component, it should be understood that it may be directly connected or coupled to another other component, but there may be other components therebetween.

Hereinafter, preferred embodiments of the present invention will be described in detail with reference to the accompanying drawings.

FIG. 1 is a diagram illustrating the overall configuration of an apparatus 100 for classifying domain non-specific images using text according to the first embodiment of the present invention.

However, this is merely a preferred embodiment to achieve the object of the present invention, and it is understood that some components may be added or deleted as needed and one component's role may be performed in conjunction with another component.

The apparatus 100 for classifying domain non-specific images using text according to the first embodiment of the present invention may comprise a processor 10, a network interface 20, a memory 30, a storage 40, and a data bus 50 connecting these components. Moreover, it may also include other additional components required to achieve the object of the present invention.

The processor 10 may control the overall operation of each component. The processor 10 may be any one of a central processing unit (CPU), a microprocessor unit (MPU), a microcontroller unit (MCU), or an artificial intelligence processor commonly known in the art to which the present invention pertains. Furthermore, the processor 10 may perform operations for at least one application or program to perform the various functions which will be described with respect to an apparatus 1000 for classifying domain non-specific images using text according to a second embodiment of the present invention.

The network interface 20 may support wired and wireless Internet communications for the apparatus 100 for classifying domain non-specific images using text according to the first embodiment of the present invention and may also support other known communication methods. Therefore, the network interface 20 may be configured to include a corresponding communication module.

The memory 30 may store various information, commands and/or information and load one or more computer programs 41 from the storage 40 to perform a method for classifying domain non-specific images using text according to a third embodiment of the present invention. In FIG. 1, RAM is shown as the memory 30, any of various storage media can also be used as the memory 30.

The storage 40 may non-temporarily store one or more computer programs 41 and large-capacity network information 42. This storage 40 may be any one of a nonvolatile memory, such as a read only memory (ROM), an erasable programmable ROM (EPROM), an electrically erasable programmable ROM (EEPROM), and a flash memory, a hard disk drive (HDD), a solid-state drive (SSD), a removable disk, or a computer-readable recording medium commonly known in the art to which the present invention pertains.

The computer program 41 may be loaded into the memory 30 and can be executed by one or more processors 10 to perform: (A) a first operation of receiving a learning dataset as an input to perform a learning process in the direction of minimizing the total loss function ($L_{total}$); and (B) a second operation of receiving an executable image represented in a specific domain to output a classification result of the executable image, wherein the first operation comprises the operations of: (1-1) receiving the learning image to generate a visual feature from the received learning image, generating and outputting a classification result of the learning image using the generated visual feature, and performing the learning process using a first loss function ($L_{task}$); (1-2) receiving the learning text to generate a textual feature from the received learning text, aligning the visual feature with the textual feature, and performing the learning process using a second loss function ($L_{align}$); and (1-3) receiving the visual feature and the classification result of the learning image to generate a text describing the learning image based on the inputs and performing the learning process using a third loss function ($L_{expl}$).

The briefly mentioned operations performed by the computer program 41 can be considered as one function of the computer program 41, and a more detailed description will be provided below in the description of the apparatus 1000 for classifying domain non-specific images using text according to a second embodiment of the present invention.

The data bus 50 serves as a pathway for the movement of commands and/or information between the processor 10, the network interface 20, the memory 30, and the storage 40 as described above.

The apparatus 100 for classifying domain non-specific images using text according to the first embodiment of the present invention as briefly described above may be in the form of a stand-alone device, for example, an electronic device or a server (including a cloud server). In this context, the electronic devices may include not only devices such as desktop PCs and server devices that are fixedly installed and used in one place, but also portable devices that are easy to carry, such as smartphones, tablet PCs, laptop PCs, PDAs, and PMPs, and it is suitable for any electronic device that includes a CPU corresponding to the processor 10 and has a network function.

Figure 2:
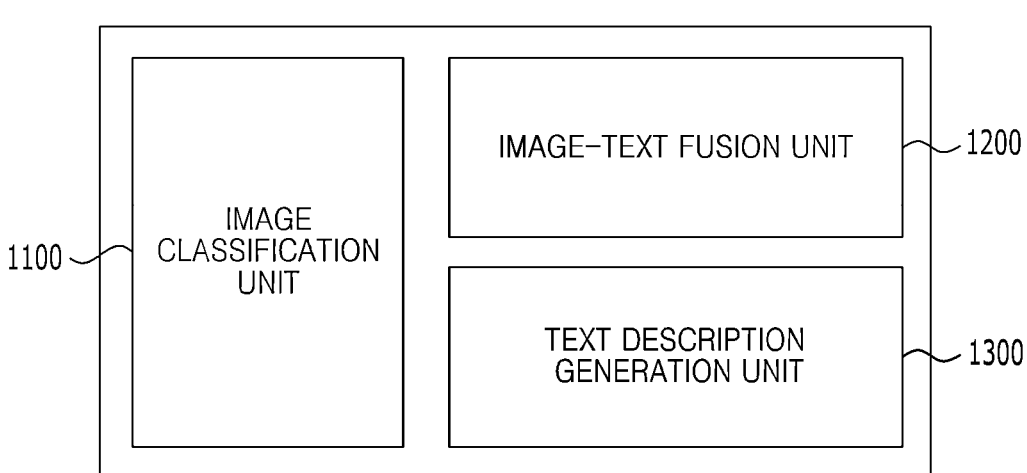
FIG. 2 is an internal structure diagram illustrating the functional components to perform the operations or calculations of an apparatus for classifying domain non-specific images using text according to a second embodiment of the present invention.

Hereinafter, on the assumption that the apparatus 100 for classifying domain non-specific images using text according to the first embodiment of the present invention is in the form of a "server" among the stand-alone electronic devices, the operations or calculations which are performed internally by the processor 10 for image classification will be described, which pertains to the apparatus 1000 for classifying domain non-specific images using text according to the second embodiment of the present invention FIG. 2 is an internal structure diagram illustrating the functional components to perform the operations or calculations of an apparatus 1000 for classifying domain non-specific images using text according to the second embodiment of the present invention.

Referring to FIG. 2, the apparatus 1000 for classifying domain non-specific images using text according to the second embodiment of the present invention may comprise an image classification unit 1100, an image-text fusion unit 1200, and a text description generation unit 1300, and may further comprise other additional components required to achieve the object of the present invention.

As mentioned above, the image classification unit 1100, the image-text fusion unit 1200, and the text description generation unit 1300 are the functional components for the operations or calculations performed internally by the processor 10. Hereinafter, the apparatus 1000 for classifying domain non-specific images using text according to the second embodiment of the present invention will be referred to as the "apparatus 1000", and in this context, the term "apparatus 1000" as used herein may have the same meaning as the processor 10.

The apparatus 1000 can operate in two main cases: one is when it performs the learning process using a learning dataset, and the other is when, after the completion of the learning process, it receives an executable image represented in a specific domain to perform actual image classification. The former case will be described first below.

Before proceeding with the description, it is necessary to first describe the learning objective of the apparatus 1000, and the learning of the apparatus 1000 aims to accurately classify images represented in domains that are not included in the learning image, even when the learning process is performed with learning images in domains that coincide with the purpose of the present invention. The learning objective can be represented by the following formula:

$$\text{Learning objective} = \underset{\theta}{\text{Minimize}} \underset{\tau:D(S,T)\leq\rho}{\sup} E\big[L_{task}(S:\theta)\big]$$

where, S refers to the domain included in the learning dataset, T refers to the domain not included in the learning dataset, D(S,T) refers to the difference between S and T, and ρ refers to the upper limit.

The operation of each component to achieve the above-mentioned learning objective will be described below.

Figure 3:
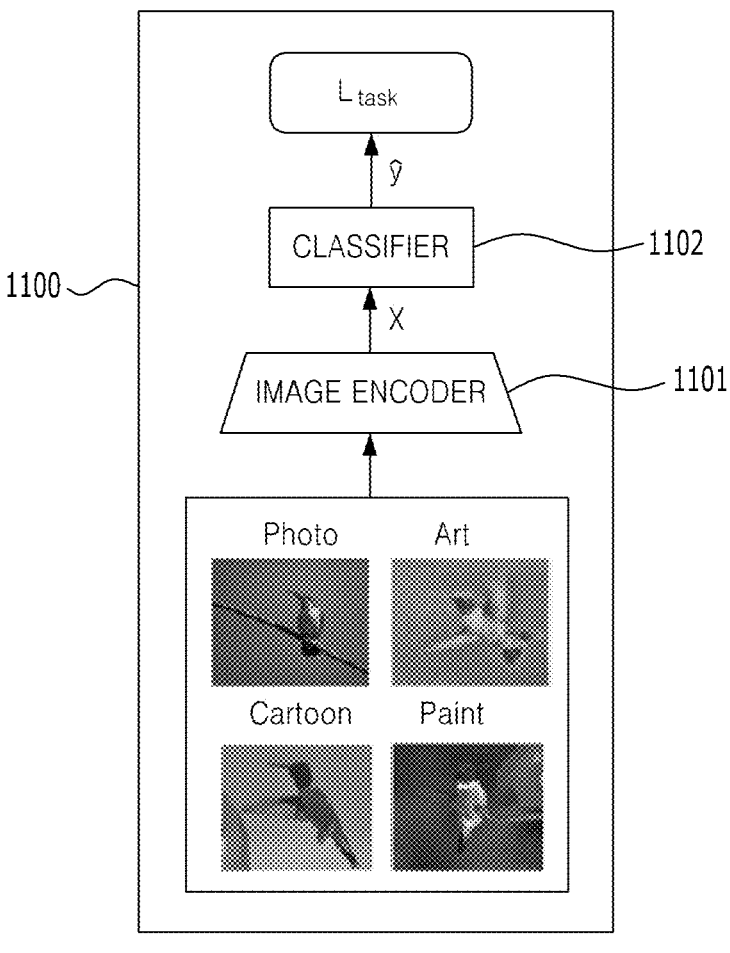
FIG. 3 is a diagram illustrating the internal structure of an image classification unit of the apparatus for classifying domain non-specific images using text according to the second embodiment of the present invention.

FIG. 3 is a diagram illustrating the internal structure of an image classification unit 1100 of the apparatus 1000 for classifying domain non-specific images using text according to the second embodiment of the present invention.

The image classification unit 1100 receives a learning image to generate a visual feature from the received learning image, generates and outputs a classification result of the learning image using the generated visual feature.

In this case, the learning image may comprise one or more images represented in one or more domains for one or more classes, and the learning image may be included in one learning dataset.

More specifically, the learning images may be represented in various domains such as sketch, watercolor, paint, art, cartoon, etc. for one or more classes, for example, various bird species such as magpies, sparrows, eagles, hawks, pigeons, owls, etc. While it is possible to represent images in only on domain for each class, it is desirable to learn the learning images represented in various domains to enhance the learning performance.

Furthermore, the learning images can include images for classes belonging to different species, not limited to the same species, for example, images for classes from different species such as eagles (birds), tigers (mammals), sharks (fish), frogs (amphibians), etc. These diverse species can be represented in various domains and used as the learning images. However, the learning performance may be somewhat reduced when using the learning images for classes from different species, compared to when using learning images for the same species.

The description of the learning images (e.g., birds, etc.) as provided above is just one example of the types of learning images, and there are no restrictions on the variety of classes represented by the learning images. Since the subjects that users may want to classify by means of the apparatus 1000 can be highly diverse, it can be said that there is no limitation on the types of classes represented by the learning images. Moreover, it is important to note that the use of learning images that share a certain level of commonality during the learning process can contribute to improving the learning performance. For the sake of illustration, let's continue with the description using the example of bird classes for learning images as illustrated in FIG. 3.

The image classification unit 1100 may comprise an image encoder (1101; featurizer) that generates the visual feature from input learning image. Referring to FIG. 3, it can be seen that the learning images pass through the image encoder, resulting in the output of a visual feature (x).

In this case, as the image classification unit 1100, it is possible to use a known pre-trained image encoder, such as a Convolution Neural Network (CNN), an AutoEncoder, a Residual Neural Network (ResNet), a Siamese Neural Network, a Transformer Network, or any other suitable encoder.

Meanwhile, the image classification unit 1100 may comprise a classifier 1102 that classifies the images using the generated visual feature, and the classifier 1102 may be a publicly known Classifier Layer (Linear Layer).

The operation of the image classification unit 1100 as described above can be summarized as follows: it receives a learning image to generate a visual feature from the received learning image, generates and outputs a classification result of the learning image using the generated visual feature; and after the learning process of the apparatus 1000 is completed, when it receives an executable image for image classification, only the image classification unit 1100 operates, excluding other components.

Meanwhile, since the objective of the image classification unit 1100 is to receive learning images and classify them into correct and accurate classes, the learning process can be performed using the following first loss function ($L_{task}$).

First loss function $(L_{task}) = -\sum_i y_i \log(\hat{y}_i) = L_{task}(y, \hat{y}) = L_{task}(S; \theta)$ where y refers to a one-hot vector in which only the ground-truth label is 1 and the others are 0, ŷ refers to the softmax distribution that is the classification result of the learning image generated using the visual features, S refers to the domain included in the learning dataset, and θ refers to the parameter of the apparatus 1000.

The above-mentioned first loss function ($L_{task}$) is the same as the image classification loss, which is the Cross-Entropy Loss.

Figure 4:
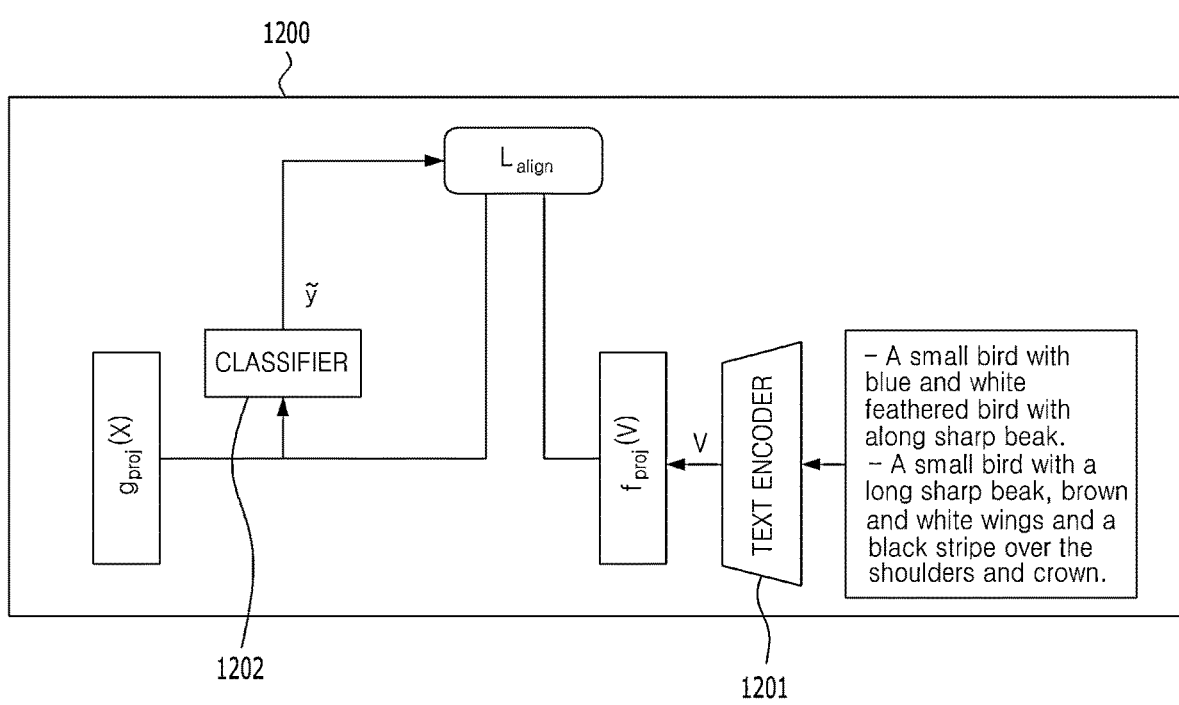
FIG. 4 is a diagram illustrating the internal structure of an image-text fusion unit of the apparatus for classifying domain non-specific images using text according to the second embodiment of the present invention.

FIG. 4 is a diagram illustrating the internal structure of an image-text fusion unit 1200 of the apparatus for classifying domain non-specific images using text according to the second embodiment of the present invention.

The image-text fusion unit 1200 receives a learning text to generate a textual feature from the received learning text and aligns the visual feature with the textual feature.

In this case, the learning text may comprise one or more texts described in one or more texts for one or more classes, and the learning text may also be included in one learning dataset, like the learning images.

As previously mentioned, continuing with the example of bird classes for learning texts, the learning texts may be texts descriptive of each class, such as magpies, sparrows, eagles, hawks, pigeons, owls, etc. For instance, taking magpies as an example, the learning texts may be texts descriptive of magpies, such as "a bird with a black beak and entirely black feathers", "a bird with a black beak, white body feathers, and black head and tail feathers", etc.

Such learning texts, which provide detailed descriptions of the classes represented by the learning images, are more likely to enhance the learning performance. For example, if the learning text is too simplistic, like "a bird with black feathers," it may not be sufficient for classifying it into a specific class because many bird species have black feathers.

The use of the learning texts as text information in the learning process by the image-text fusion unit 1200 of the apparatus 1000 is a unique feature of the present invention that applies the human inference process to prevent the degradation of classification performance of artificial intelligence models for image classification when images from domains different from the domains of the learning images are input. For example, if a human looks at an image of an elephant drawn in the watercolor domain in a book and remembers the image by matching the visual features of the elephant with a textual feature such as "An elephant is a herbivorous mammal with a large body, long ivory tusks, and large ears" (it's human thinking), then later, regardless of how the elephant is represented in any domain, the human can accurately classify the image as an elephant by identifying the visual features representing the elephant from the image and matching them with the remembered textual features, which is achieved through the configuration of the image-text fusion unit 1200.

Figure 5:
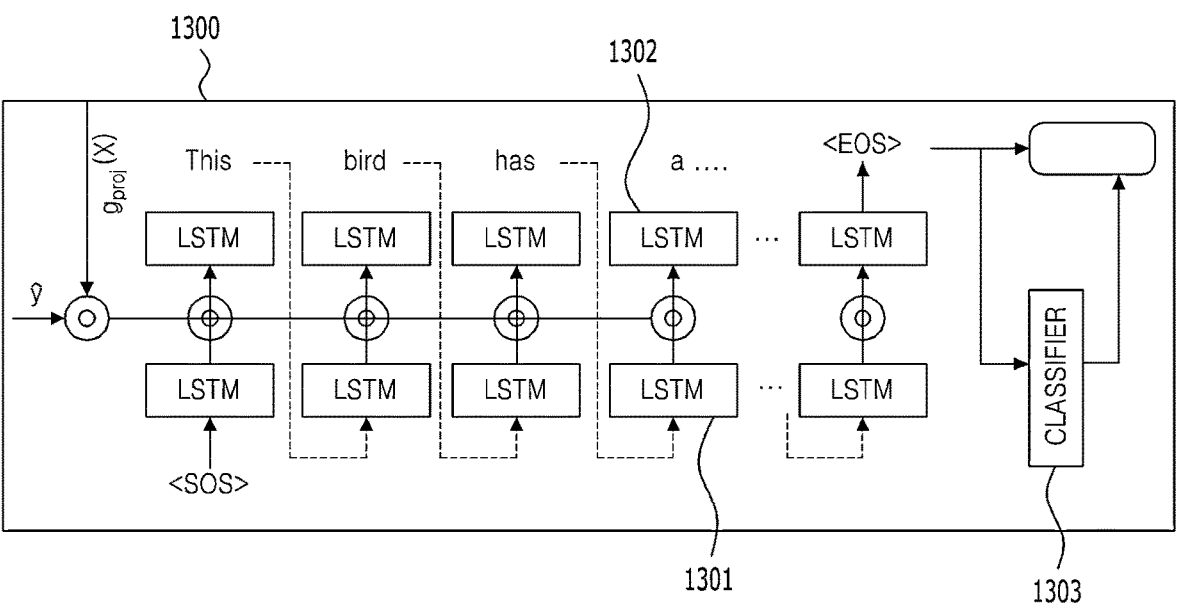
FIG. 5 is a diagram illustrating the internal structure of a text description generation unit of the apparatus for classifying domain non-specific images using text according to the second embodiment of the present invention.

Accordingly, the image-text fusion unit 1200 may comprise a text encoder 1201 that generates a textual feature from a learning text, and referring to FIG. 5, it can be seen that the learning text passes through the text encoder, resulting in the output of a textual feature (v) (i.e., a kind of textual pivot).

In this case, as the text encoder 1201, it is possible to use a known pre-trained image encoder, such as a Bag-of-Words (BoW) encoder, a Term Frequency-Inverse Document Frequency (TF-IDF) encoder, a Word Embedding encoder, a Character-Level encoder, a Transformer Network, or any other suitable encoder. It is also possible to use a text encoder based on a contrastive language-image pre-training (CLIP) model, which consists of 630,000 parameters, and it is further possible to use the text description generation unit 1300 to be described later as the text encoder 1201, which will be discussed in more detail.

The operation of the text encoder 1201 can be described in more detail as follows: it receives a variable-length sentence, which is a learning text, and outputs a fixed-length latent vector (v), where the latent vector is referred to as a pivot, and the apparatus 1000 performs the learning process so that the image encoder 1101 generates a visual feature (x) that aligns well with the pivot. In the present invention, it is assumed that the text contains cues that can help differentiate classes by reflecting a visual meaning with the human inference process, and thus the image encoder 1101 can internalize knowledge through the process of aligning the textual feature with the visual feature. To this end, the image-text fusion unit 1200 can perform the learning process using the following second loss function ($L_{align}$):

Second loss function $(L_{align}) = \left\| f_{proj}(v) - g_{prog}(x) \right\|_2 - \sum_i y_i \log(\hat{y}_i)$ where $f_{proj}$ refers to the projection layer for textual features, $g_{proj}$ refers to the projection layer for visual features, y refers to a one-hot vector in which only the ground-truth label is 1 and the others are 0, and ŷ refers to the softmax distribution obtained from $g_{prog}(x)$ passing through a classifier 1202. The description of the classifier 1202 is replaced with the description of the classifier 1102 in the image classification unit 1100.

In the second loss function ($L_{align}$) as described above, the first term represents the difference between textual features and visual features, essentially the difference between the features represented in texts and the features represented in images. As the difference becomes smaller, it can be considered that the learning text and the learning image are well aligned, and the learning process can be performed using only the first term. However, in the present invention, the inclusion of the second term serves as a measure to avoid the cases where the solution collapses, such as when all points are projected to the same point, contribute to improving the learning performance.

FIG. 5 is a diagram illustrating the internal structure of a text description generation unit 1300 of the apparatus 1000 for classifying domain non-specific images using text according to the second embodiment of the present invention.

The text description generation unit 1300 receives the visual feature and the classification result of the learning image from the image classification unit 1100 and generates a text describing the learning image based on the inputs.

To this end, the text description generation unit 1300 includes two long short-term memory (LSTM) layers, referred to a first LSTM layer 1301 and a second LSTM layer 1302, respectively.

The first LSTM layer 1301 receives the previously generated token ($o_{t-1}$) and updates the hidden state to generate an output ($z_t$). This output can be input to the second LSTM layer 1302 along with a vector that includes the projected visual feature and a predicted value, which is the classification result of the learning image by the classifier 1102 of the image classification unit 1100.

From the perspective of the second LSTM layer 1302, it receives the output token ($z_t$) of the first LSTM layer 1301, the projected visual feature, and the classification result (i.e., the predicted value) of the learning image. Based on the input value, the second LSTM layer 1302 generates the softmax probability value ($\rho(o_t)$) for each word held by the second LSTM layer 1302 of the text description generation unit 1300, and outputs a word token with the highest probability value. The output of the word token is repeated until the word token output by the second LSTM layer 1302 satisfies an-end of-sentence token (EOS) or a predetermined number of sampled word tokens.

At this point, the text description generation unit 1300 performs the learning process using a third loss function ($L_{expl}$) based on reinforcement learning to generate a text that can better classify the classes represented by the learning image and provide a slightly better description.

$$\text{Third loss function } (L_{expl}) = -\sum_t \log P(o_{t+1} \mid o_{0:t}, I, C) - E_{\tilde{o} \sim P(o\mid I,c)}[R(\tilde{O})]$$

where $\tilde{O} \sim p(o\mid I, c)$ refers to the sentence sampled to generate a text describing the learning image, $p(O\mid I,C)$ refers to the estimated distribution for the description (o) when the learning image (I) and the class (C) are given as conditions, and $R(\tilde{O})$ refers to the softmax probability per class when there is a sentence (O) generated from $P(c\mid\tilde{o})$.

Meanwhile, as mentioned in the previous description of the image-text fusion unit 1200, the text description generation unit 1300 can be used as the text encoder 1201. The reason for this is that the text description generation unit 1300 generates a text in natural language that can justify the choice of the apparatus 1000, to put it simply, that can support the classification result of the learning image of the apparatus 1000, and the hidden state, which is finally updated as the word token with the highest probability value is output through the two LSTM layer, can be considered as the textual feature (v).

Figure 6:
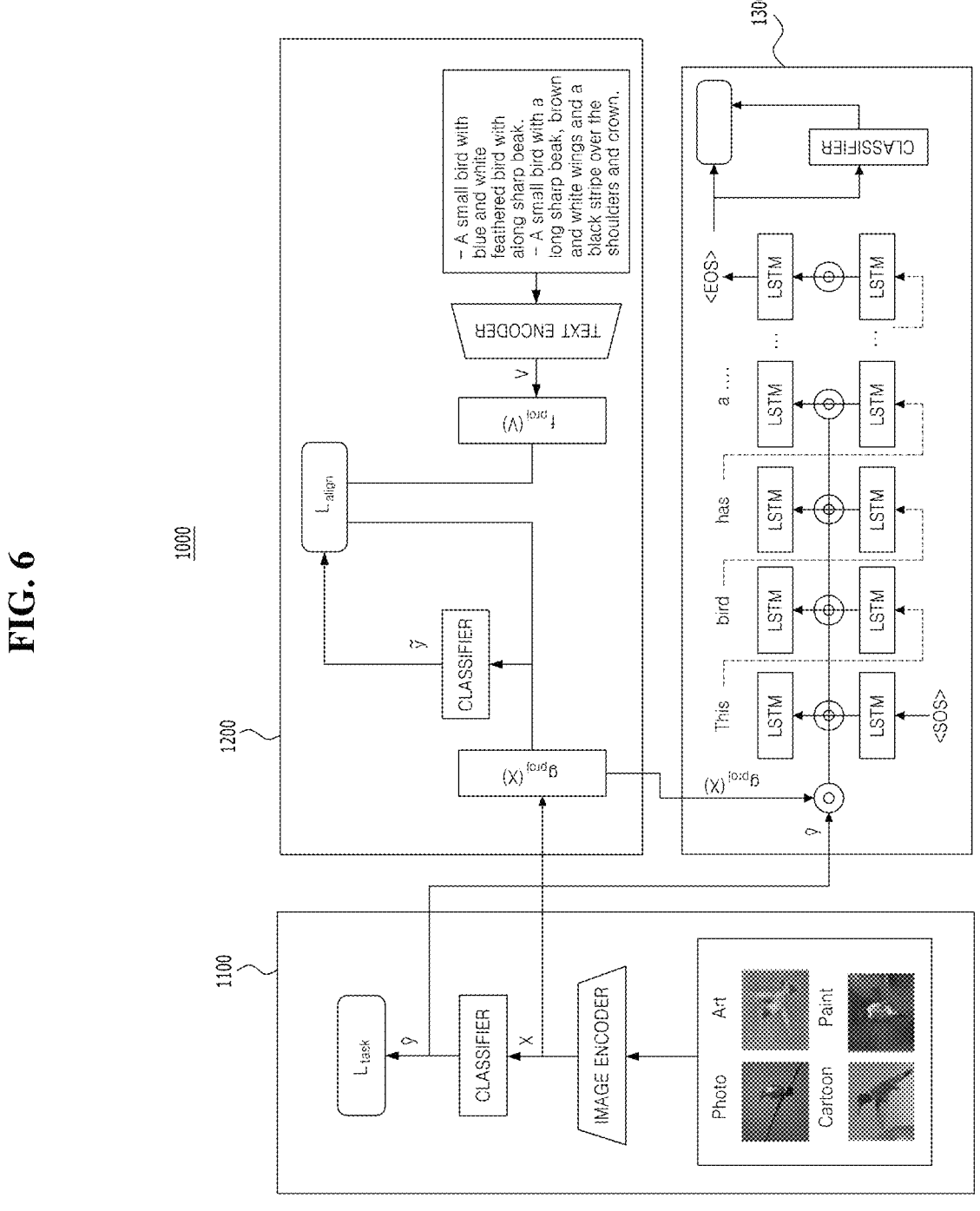
FIG. 6 is a diagram illustrating the overall internal structure of the apparatus for classifying domain non-specific images using text according to the second embodiment of the present invention.

So far, the functional components to perform the operations or calculations of the apparatus 1000 for classifying domain non-specific images using text according to the second embodiment of the present invention have been described with respect to the case where the learning process is performed using the learning dataset. It has been previously described that the loss functions applied to the learning progress of each of the image classification unit 1100, the image-text fusion unit 1200, and the text description generation unit 1300 are the first loss function ($L_{task}$), the second loss function ($L_{align}$), and the third loss function ($L_{expl}$). From the overall aspect of the apparatus 1000, the total loss function ($L_{total}$) may be the sum of these three loss functions as follows, and the learning process may be performed as an optimization process that minimizes the total loss function ($L_{total}$). The overall internal structure of the apparatus 1000 related thereto is illustrated in FIG. 6.

$$\text{Total loss function} (L_{total}) = \text{First loss function} (L_{task}) +$$
$$\lambda_{align} \text{ loss function} (L_{align}) + \lambda_{expl} \text{ loss function} (L_{expl})$$

where $\lambda_{align}$ and $\lambda_{expl}$ refer to the hyperparameters that control the strength of alignment loss and explanation loss, respectively.

The description of the components related to the learning process of the apparatus 1000 will now be finished, and the case where, after completing the learning process, the apparatus 1000 receives an executable image represented in a specific domain to perform actual image classification will be described briefly.

As mentioned earlier, in the case where, after completing the learning process, the apparatus 1000 performs actual image classification, only the image classification unit 1100 operates, and the image-text fusion unit 1200 and the text description generation unit 1300, which contribute to improving the learning performance of the apparatus 1000, do not operate in this scenario. This is because the image classification unit 1100 has been influenced by their operations during the learning process.

Therefore, the explanation of actual image classification is very simple: the encoder 1101 receives an actual image represented in a specific domain (where this specific domain may or may not be the domain of the learning image, with the latter being more suitable for the purpose of the present invention) to generates a visual feature (x), and the generated visual feature (x) passes through the classifier 1102, resulting in the output of an image classification result. In this process, the image encoder 1101 and the classifier 1102 have been trained to generate the visual feature (x) that aligns well with the textual feature from the input image by applying the human inference process, and output an image classification result that is conceptually similar to the human thinking process.

So far, the apparatus 1000 for classifying domain non-specific images using text according to the second embodiment of the present invention has been described. According to the present invention, the learning process is performed not only using the images but also text information together, and thus even during training on images from only a few specific domains, it is possible to effectively classify the images from different domains with high accuracy by applying the human inference process.

Figure 7:
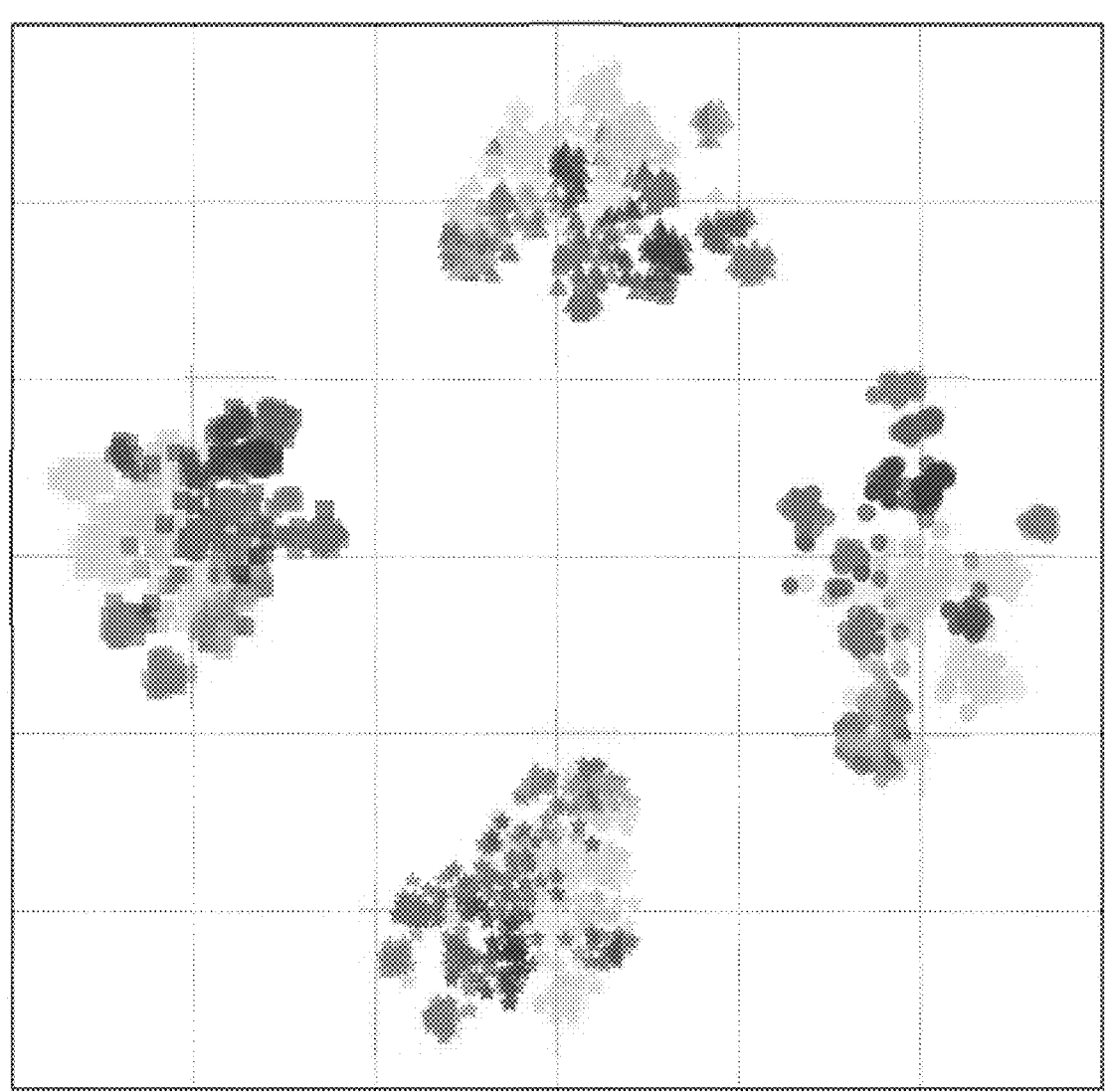
Figure 8:
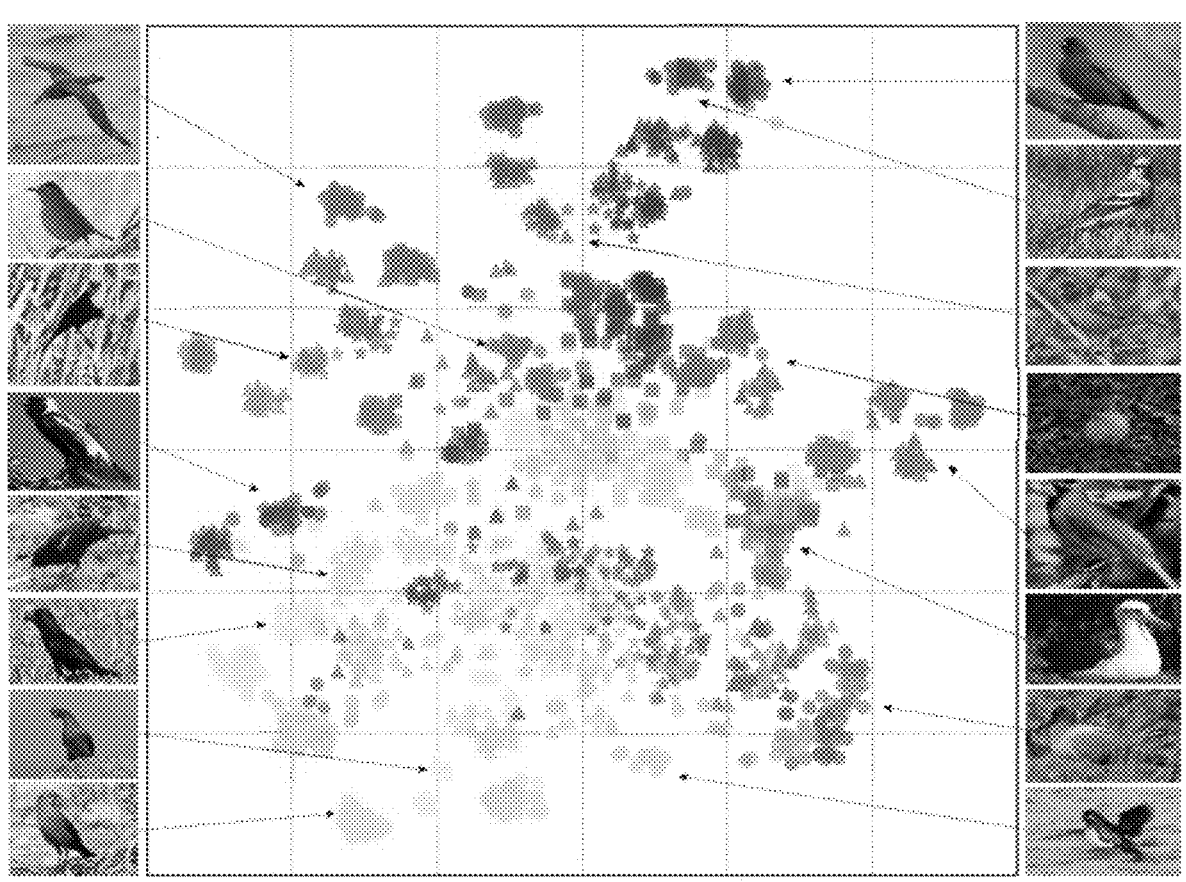

Referring to FIGS. 7 to 9, which show performance evaluation data for the apparatus 1000 for classifying domain non-specific images using text according to the second embodiment of the present invention, compared to the prior art, it can be seen from FIG. 7 that the image classification results according to the conventional Empirical Risk Minimization (ERM) model show a poor class classification as different colors representing different classes are clustered together based on similar patterns representing the same domain; however, referring to FIG. 8, it can be seen that the same colors representing the same class are clustered together, and the patterns representing the domains are scattered, indicating that the image classification for each class has been successful, regardless of the domains.

Furthermore, referring to FIG. 9, it can be seen that the average prediction accuracy of the present invention is higher than that of the conventional techniques. As an example, in the case where the CLIP text encoder is used as the text encoder 1201 in the present invention, during training on images from the cartoon, art, and paint domains, the prediction accuracy for images from the photo domain is 74.6, and in the case where the text description generation unit 1300 is used as the text encoder 1201 in the present invention, the prediction accuracy for the same test is 74.3, which are significantly higher than the prediction accuracy for the same test with the conventional techniques.

Lastly, the apparatus 100 for classifying domain non-specific images using text according to the first embodiment of the present invention and the apparatus 1000 for classifying domain non-specific images using text according to the second embodiment of the present invention can be implemented as the method for classifying domain non-specific images using text, according to the third embodiment of the present invention as illustrated in FIG. 10. In this case, the method for classifying domain non-specific images using text, according to the third embodiment of the present invention may comprise: (a) a first step of receiving a learning dataset as an input to perform a learning process in the direction of minimizing the total loss function ($L_{total}$); and (b) a second step of receiving an executable image represented in a specific domain to output a classification result of the executable image, wherein the learning dataset contains one or more learning images represented in one or more domains for one or more classes and one or more learning texts described in one or more texts for the one or more classes, wherein the first step comprises the steps of: (1-1) receiving the learning image to generate a visual feature from the received learning image, generating and outputting a classification result of the learning image using the generated visual feature, and performing the learning process using a first loss function ($L_{task}$); (1-2) receiving the learning text to generate a textual feature from the received learning text, aligning the visual feature with the textual feature, and performing the learning process using a second loss function ($L_{align}$); and (1-3) receiving the visual feature and the classification result of the learning image to generate a text describing the learning image based on the inputs and performing the learning process using a third loss function ($L_{expl}$).

Furthermore, the apparatus 100 for classifying domain non-specific images using text according to the first embodiment of the present invention and the apparatus 1000 for classifying domain non-specific images using text according to the second embodiment of the present invention can be implemented as a computer program stored on a computer-readable medium according to a fourth embodiment of the present invention. In this case, the computer program stored on a computer-readable medium according to the fourth embodiment of the present invention, when executed on a computing device, may perform: (AA) a first step of receiving a learning dataset as an input to perform a learning process in the direction of minimizing the total loss function ($L_{total}$); and (BB) a second step of receiving an executable image represented in a specific domain to output a classification result of the executable image, wherein the learning dataset contains one or more learning images represented in one or more domains for one or more classes and one or more learning texts described in one or more texts for the one or more classes, wherein the first step comprises the steps of: (1-1) receiving the learning image to generate a visual feature from the received learning image, generating and outputting a classification result of the learning image using the generated visual feature, and performing the learning process using a first loss function ($L_{task}$); (1-2) receiving the learning text to generate a textual feature from the received learning text, aligning the visual feature with the textual feature, and performing the learning process using a second loss function ($L_{align}$); and (1-3) receiving the visual feature and the classification result of the learning image to generate a text describing the learning image based on the inputs and performing the learning process using a third loss function ($L_{expl}$).

Here, although not described in detail for the sake of avoiding redundancy, all the technical features applied to the apparatus 100 for classifying domain non-specific images using text according to the first embodiment of the present invention and the apparatus 1000 for classifying domain non-specific images using text according to the second embodiment of the present invention can also be equally applied to the method for classifying domain non-specific images using text, according to the third embodiment of the present invention and the computer program stored on a computer-readable medium according to the fourth embodiment of the present invention.

Although the embodiments of the present invention have been described with reference to the accompanying drawings, those skilled in the art to which the present invention pertains can understand that the present disclosure can be implemented in other specific forms without changing the technical spirit or essential features thereof. Therefore, the embodiments described above should be understood as illustrative in all respects and not restrictive.

BRIEF DESCRIPTION OF REFERENCE NUMERALS

10: processor
20: network interface
30: memory
40: storage
41: computer program
50: data bus
100, 1000: apparatus for classifying domain non-specific images using text
1100: image classification unit
1101: image encoder
1102: classifier
1200: image-text fusion unit
1201: text encoder
1202: classifier
1300: text description generation unit
1301: first LSTM layer
1302: second LSTM layer
What is claimed is:

1. An apparatus for classifying domain non-specific images using text, the apparatus comprising:

an image classification unit configured to receive a learning image to generate a visual feature from the received learning image, to generate and output a classification result of the learning image using the generated visual feature, and to perform a learning process using a first loss function ($L_{task}$);

an image-text fusion unit configured to receive a learning text to generate a textual feature from the received learning text, to align the visual feature with the textual feature, and to perform the learning process using a second loss function ($L_{align}$); and a text description generation unit configured to receive the visual feature and the classification result of the learning image to generate a text describing the learning image based on the inputs and to perform the learning process using a third loss function ($L_{expl}$), wherein the learning image comprises one or more images represented in one or more domains for one or more classes, and the learning text comprises one or more texts described in one or more texts for the one or more classes, wherein the learning image and the learning text are included in one learning dataset, and wherein the image classification unit is configured to perform the learning process using the first loss function ($L_{task}$) according to Equation 1 below:

15

$$L_{task} = -\sum_i y_i \log(\hat{y}_i) \qquad \text{Equation 1}$$

where y refers to a one-hot vector in which a ground-truth
label is 1 and others are 0, and ŷ refers to a softmax
distribution that is the classification result of the learn-
ing image generated using the visual feature.

2. The apparatus of claim 1, wherein the image classifi-
cation unit comprises a Residual Neural Network (ResNet)
as an image encoder configured to generate the visual
feature from the received learning image.

3. The apparatus of claim 1, wherein the image-text fusion
unit comprises a text encoder based on a contrastive lan-
guage-image pre-training (CLIP) model configured to gen-
erate the textual feature from the received learning text.

4. The apparatus of claim 1, wherein the image-text fusion
unit is configured to use the text description generation unit
as a text encoder configured to generate the textual feature
from the received learning text.

5. The apparatus of claim 1, wherein the image-text fusion
unit is configured to perform the learning process using the
second loss function ($L_{align}$) according to Equation 2 below:

$$L_{align} = \left\| f_{proj}(v) - g_{prog}(x) \right\|_2 - \sum_i y_i \log(\hat{y}_i) \qquad \text{Equation 2}$$

where $f_{proj}$ refers to the projection layer for textual fea-
tures, $g_{proj}$ refers to the projection layer for visual
features, y refers to a one-hot vector in which a
ground-truth label is 1 and others are 0, and ỹ refers to
a softmax distribution obtained from $g_{prog}(x)$.

6. The apparatus of claim 1, wherein the text description
generation unit comprises a first long short-term memory
(LSTM) layer and a second LSTM layer, wherein the second LSTM layer is configured to receive
an output token from the first LSTM layer, the visual
features and the classification result of the learning
image, to generate a softmax probability value for each
word held by the text description generation unit, and
to output a word token with the highest probability
value, and wherein the output of the word token is repeated until the
word token output by the second LSTM layer satisfies
an-end of-sentence token (EOS) or a predetermined
number of sampled word tokens.

7. The apparatus of claim 1, wherein the text description
generation unit is configured to perform the learning process
using a third loss function ($L_{expl}$) according to Equation 3
below:

$$L_{expl} = -\sum_t \log P(o_{t+1} \mid o_{0:t}, I, C) - E_{\tilde{O} \sim P(o|I,c)}[R(\tilde{O})] \qquad \text{Equation 3}$$

where, Õ~p(o|I, c) refers to a sentence sampled to gen-
erate a text describing the learning image, p(O|I, C)
refers to an estimated distribution for the description
(o) when the learning image (I) and the class (C) are
given as conditions, and R (O) refers to a softmax
probability per class when there is a sentence (Õ)
generated from P(c|õ).

8. The apparatus of claim 1, wherein the apparatus is
configured to perform the learning process in a direction of
minimizing a total loss function ($L_{total}$) that is equal to a weighted sum of the first loss function ($L_{task}$), the second
loss function ($L_{align}$), and the third loss function ($L_{expl}$).

9. A method for classifying domain non-specific images
using text, performed by an apparatus comprising a process
and a memory, the method comprising:

(a) a first step of receiving a learning dataset as an input
to perform a learning process in a direction of mini-
mizing a total loss function ($L_{total}$); and (b) a second step of receiving an executable image
represented in a specific domain to output a classifica-
tion result of the executable image, wherein the learning dataset contains one or more learn-
ing images represented in one or more domains for one
or more classes and one or more learning texts
described in one or more texts for the one or more
classes, wherein the first step comprises the steps of:

(1-1) receiving the learning image to generate a visual
feature from the received learning image, generating
and outputting a classification result of the learning
image using the generated visual feature, and perform-
ing the learning process using a first loss function
($L_{task}$);

(1-2) receiving the learning text to generate a textual
feature from the received learning text, aligning the
visual feature with the textual feature, and performing
the learning process using a second loss function
($L_{align}$); and (1-3) receiving the visual feature and the classification
result of the learning image to generate a text describ-
ing the learning image based on the inputs and per-
forming the learning process using a third loss function
($L_{expl}$), and wherein the learning process is performed using the first
loss function ($L_{task}$) according to Equation 1 below:

$$L_{task} = -\Sigma_i y_i \log(\hat{y}_i) \qquad \text{Equation 1:}$$

where y refers to a one-hot vector in which a ground-truth
label is 1 and others are 0, and ŷ refers to a softmax
distribution that is the classification result of the learn-
ing image generated using the visual feature.

10. A computer program stored on a non-transitory com-
puter-readable medium, when executed on a computing
device performing:

(AA) a first step of receiving a learning dataset as an input
to perform a learning process in a direction of mini-
mizing a total loss function ($L_{total}$); and (BB) a second step of receiving an executable image
represented in a specific domain to output a classifica-
tion result of the executable image, wherein the learning dataset contains one or more learn-
ing images represented in one or more domains for one
or more classes and one or more learning texts
described in one or more texts for the one or more
classes, wherein the first step comprises the steps of:

(1-1) receiving the learning image to generate a visual
feature from the received learning image, generating
and outputting a classification result of the learning
image using the generated visual feature, and perform-
ing the learning process using a first loss function
($L_{task}$);

(1-2) receiving the learning text to generate a textual
feature from the received learning text, aligning the
visual feature with the textual feature, and performing
the learning process using a second loss function
($L_{align}$); and (1-3) receiving the visual feature and the classification result of the learning image to generate a text describing the learning image based on the inputs and performing the learning process using a third loss function ($L_{expl}$), and wherein the learning process is performed using the first loss function ($L_{task}$) according to Equation 1 below:

$$L_{task} = -\Sigma_i y_i \log(\hat{y}_i)$$

Equation 1:

where y refers to a one-hot vector in which a ground-truth label is 1 and others are 0, and ŷ refers to a softmax distribution that is the classification result of the learning image generated using the visual feature.

\* \* \* \* \*